DEFENSIVE PUBLICATION

UNITED STATES PATENT AND TRADEMARK OFFICE

Published at the request of the applicant or owner in accordance with the Notice of Dec. 16, 1969, 860 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED FEBRUARY 3, 1976

943 O.G. 75

T943,807

RIGID UNSATURATED POLYESTER CELLULAR MATERIAL

Don R. Leonard, Rte. 15, 421 Old Castle Road, Kingsport, Tenn. 37660, and Lee H. Davis, 8143 NW. Twin Oaks Drive, Kansas City, Mo. 64151

Filed Aug. 27, 1974, Ser. No. 500,998
Int. Cl. C08f 283/00
U.S. Cl. 260—2.5 N
No Drawing. 8 Pages of Specification A composition for producing rigid, cellular plastics from unsaturated polyesters is disclosed. According to the disclosure, an unsaturated polyester produced from a glycol, an unsaturated acid or anhydride, and optionally a saturated acid, is mixed with a polymerizable vinyl monomer, a silicone surfactant, a curing catalyst, and a polymercaptan. The mixture is capable of being mechanically frothed, and subsequently cured to produce a rigid, cellular, low density product having a desirable cell structure and good physical properties.